United States Patent
Han et al.

(10) Patent No.: US 12,408,058 B2
(45) Date of Patent: Sep. 2, 2025

(54) METHOD AND DEVICE FOR PROVIDING NETWORK ANALYSIS INFORMATION FOR RFSP INDEX SELECTION IN MOBILE COMMUNICATION NETWORK

(71) Applicant: Samsung Electronics Co., Ltd., Gyeonggi-do (KR)

(72) Inventors: Yoonseon Han, Gyeonggi-do (KR); Jungshin Park, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 486 days.

(21) Appl. No.: 17/774,349

(22) PCT Filed: Nov. 5, 2020

(86) PCT No.: PCT/KR2020/015421
§ 371 (c)(1),
(2) Date: May 4, 2022

(87) PCT Pub. No.: WO2021/091266
PCT Pub. Date: May 14, 2021

(65) Prior Publication Data
US 2022/0408293 A1    Dec. 22, 2022

(30) Foreign Application Priority Data
Nov. 6, 2019    (KR) .................. 10-2019-0141206

(51) Int. Cl.
*H04W 24/10*    (2009.01)
*H04L 41/0894*    (2022.01)
(Continued)

(52) U.S. Cl.
CPC ......... *H04W 24/10* (2013.01); *H04L 41/0894* (2022.05); *H04L 41/14* (2013.01); *H04W 88/18* (2013.01)

(58) Field of Classification Search
CPC ....... H04W 24/10; H04W 8/24; H04W 88/18; H04W 24/02; H04W 24/04; H04W 16/18;
(Continued)

(56) References Cited

U.S. PATENT DOCUMENTS 10,582,366 B2    3/2020    Gupta et al.
11,800,394 B2 *  10/2023   Han .................. H04W 28/0967
(Continued)

FOREIGN PATENT DOCUMENTS

KR    10-1833187    2/2018

OTHER PUBLICATIONS

China Telecom, FS_eNA use case: NWDAF-assisted RAT/frequency selection for energy saving, Release: FS_eNA / Rel-17, SA WG2 Meeting #135 S2-1908944, Oct. 14, 2019 (Year: 2019).*
(Continued)

*Primary Examiner* — Mounir Moutaouakil
(74) *Attorney, Agent, or Firm* — The Farrell Law Firm, P.C.

(57) ABSTRACT

The present disclosure relates to: a communication technique merging IoT technology with a 5G communication system for supporting a data transmission rate higher than that of a 4G system, and a system therefor. The present disclosure can be applied to intelligent services (for example, smart home, smart building, smart city, smart car or connected car, healthcare, digital education, retail, security, and safety-related services, and the like) on the basis of 5G communication technology and IoT-related technology. An NWDAF according to an embodiment of the disclosure transmits analytics information or prediction information related to wireless access technology and a frequency band and, additionally, provides information for identifying service demand levels of each terminal. Therefore, a network operator or an entity in charge of same can cause terminals
(Continued)

to use a specific wireless access technology or frequency band. Thus, the operator can reduce the power consumed by unnecessary base stations or resources, or can maximize the quality of service experienced by a user through a predicted result.

15 Claims, 9 Drawing Sheets

(51) Int. Cl.
  *H04L 41/14* (2022.01)
  *H04W 88/18* (2009.01)
(58) Field of Classification Search
  CPC .... H04W 28/16; H04L 41/14; H04L 41/0894; Y02D 30/70
  See application file for complete search history.

(56) References Cited

U.S. PATENT DOCUMENTS

| | | | | |
|---|---|---|---|---|
| 11,805,022 | B2* | 10/2023 | Han | H04L 41/14 |
| 11,855,864 | B2* | 12/2023 | Han | H04L 43/062 |
| 2018/0192324 | A1* | 7/2018 | Bernini | H04W 28/0808 |
| 2019/0191330 | A1* | 6/2019 | Dao | H04L 12/4633 |
| 2019/0394279 | A1* | 12/2019 | Dao | H04L 67/14 |
| 2021/0144063 | A1* | 5/2021 | Abboud | H04W 28/084 |
| 2021/0235288 | A1* | 7/2021 | Dao | H04W 24/08 |

OTHER PUBLICATIONS

PCT/ISA/210 Search Report issued on PCT/KR2020/015421, Jan. 26, 2021 pp. 3.
PCT/ISA/237 Written Opinion issued on PCT/KR2020/015421, Jan. 26, 2021, pp. 4.
China Telecom etc., "FS_eNA use case: NWDAF-assisted RAT/frequency selection", S2-1910167, 3GPP TSG SA WG2 #135, Split, Croatia, Oct. 18, 2019, pp. 4.
China Mobile, "Clarification on Network data analytics procedure", S2-182217, 3GPP TSG SA WG2 #126, Montreal, Canada, Feb. 20, 2018, pp. 5.
CATT, "Solution for optimizing connection management based on NWDAF output", S2-185253, 3GPP TSG SA WG2 #127b, Newport Beach, US, May 22, 2018, pp. 5.
Huawei etc., "Input for PCC decision from NWDAF", S2-1903471, 3GPP TSG SA WG2 #132, Xi'an, China, Apr. 2, 2019, pp. 7.
KDDI etc., "NWDA-assisted Determination of Transfer Policy", S2-182974, 3GPP TSG SA WG2 #126, Montreal, Canada, Mar. 5, 2018, pp. 4.
3GPP TS 23.288 V16.1.0, (Sep. 2019), pp. 52.
3GPP TS 23.501 V16.1.0, (May 2019), pp. 366.
Nokia et al., "Correcting AMF Behaviour for Service Request that is not Integrity Protected", S2-1903668, SA WG2 Meeting #132, Apr. 8-12, 2019, 371 pages.
Korean Office Action dated Jul. 30, 2025 issued in counterpart application No. 10-2019-0141206, 12 pages.

* cited by examiner

METHOD AND DEVICE FOR PROVIDING NETWORK ANALYSIS INFORMATION FOR RFSP INDEX SELECTION IN MOBILE COMMUNICATION NETWORK

PRIORITY

This application is a National Phase Entry of PCT International Application No. PCT/KR2020/015421, which was filed on Nov. 5, 2020, and claims priority to Korean Patent Application No. 10-2019-0141206, which was filed on Nov. 6, 2019, the entire content of each of which is incorporated herein by reference.

TECHNICAL FIELD

The disclosure relates to a method of automating or supporting a process of selecting an optimal value of network-related configuration values by using network analytics information in a mobile communication system. The disclosure relates to an apparatus and method for collecting, by an NWDAF disposed in a core network or an entity equivalent to the NWDAF, network analytics information from apparatuses disposed inside or outside a network, processing the analysis of the network analytics information, and delivering the results of the processing. The analytics information may include analytics information and wired and radio network situation information related to a UE, and analytics information related to a service used by each UE, and may include prediction information related to future timing along with statistical analytics information for the past and current situations.

BACKGROUND ART

In order to satisfy wireless data traffic demands that tend to increase after 4$^{th}$ generation (4G) communication system commercialization, efforts to develop an enhanced 5G communication system [or a pre-5G communication system] are being made. For this reason, the 5G communication system [or pre-5G communication system] is called a beyond 4G network communication system or a post LTE system.

In order to achieve a high data transfer rate, an implementation of the 5G communication system in a mmWave band (e.g., 60 Giga (60 GHz) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming and large scale antenna technologies are being discussed in the 5G communication system.

Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system.

In addition, hybrid FSK and QAM (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

Meanwhile, the Internet evolves from a human-centered connection network over which human generates and consumes information to Internet of things (IoT) through which information is exchanged and processed between distributed elements, such as things. An Internet of everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched. In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication, such as a sensor network, machine to machine (M2M) and machine type communication (MTC), are implemented by schemes, such as beamforming, MIMO, and an array antenna. The application of a cloud radio access network (cloud RAN) as the aforementioned big data processing technology may be said to be an example of convergence between the 5G technology and the IoT technology.

Meanwhile, simultaneously with the start of the supply of 5G mobile communication, various radio access technologies, such as the existing 3G or 4G (LTE) communication networks are mixed, and an available frequency band is expanded due to the introduction of a high frequency. It is expected that more base stations than the existing base stations will be installed in order to satisfy high communication requirements. In such a situation, there is a need for research of a method of efficiently managing radio resources and apparatuses in order to reduce a cost or power necessary for network management or minimize interference.

DISCLOSURE

Technical Problem

Various embodiments of the disclosure include a method of supporting that a UE or a base station automates the selection of a radio access technology or a frequency band for radio access or makes an optimized determination therefor by using analytics information provided by an NWDAF within a mobile communication system. In this case, the NWDAF includes a method of collecting information from sources for various types of information, which are disposed inside or outside mobile communication, and processing the information in order to generate such network analytics information and providing the information.

Technical objects to be achieved in the disclosure are not limited to the aforementioned technical objects, and other technical objects not described above may be evidently understood by a person having ordinary knowledge in the art to which the disclosure pertains from the following description.

Technical Solution

In the disclosure for solving the aforementioned problems, a method by a network data analytics function (NWDAF) includes receiving a message to request network analytics information for a radio access technology and frequency for each specific area, collecting information for providing the network analytics information based on the message, generating the network analytics information based on the collected information, and transmitting the generated network analytics information to a policy control function (PCF). A radio/frequency selection priority (RFSP) index value is determined by the PCF based on the transmitted network analytics information.

In some examples, the generated analytics information includes at least one of the total number of UEs being used in a specific area, the number of UEs for each radio access technology, the number of UEs for each frequency band, the number of off-loadable UEs to another radio access technology, the number of non-off-loadable UEs to another radio access technology, the number of off-loadable UEs to another frequency band, the number of non-off-loadable UEs to another frequency band, a total data rate, a data rate for each radio access technology, and a data rate for each frequency band.

In some examples, the generated network analytics information includes usage-related analytics information of a UE. The usage-related analytics information of the UE includes at least one of information on a slice used by the UE, information on a data network used by the UE, an identifier of the UE, a UE usage type, a media type, a mobility type, an average bandwidth, a maximum bandwidth, a use application list, and a 5G quality of service identifier (5QI) list.

In some examples, the method further includes receiving, from operation, administration and maintenance (OAM), the message to request the network analytics information for a radio access technology and frequency for each specific area, and transmitting the generated analytics information to the OAM.

In another example of the disclosure, a method by a policy control function (PCF) in a wireless communication system includes transmitting, to a network data analytics function (NWDAF), a message to request network analytics information for a radio access technology and frequency for each specific area, receiving, from the NWDAF, the network analytics information generated based on the message, and determining a radio/frequency selection priority (RFSP) index value based on the received network analytics information. The received network analytics information is generated by the NWDAF based on information collected based on the message.

In still another example of the disclosure, a network data analytics function (NWDAF) includes a transceiver unit capable of transmitting and receiving at least one signal and a controller combined with the transceiver unit. The controller is constituted to receive a message to request network analytics information for a radio access technology and frequency for each specific area, collect information for providing the network analytics information based on the message, generate the network analytics information based on the collected information, and transmit the generated network analytics information to a policy control function (PCF). A radio/frequency selection priority (RFSP) index value is determined by the PCF based on the transmitted network analytics information.

In other examples of the disclosure, a policy control function (PCF) includes a transceiver unit capable of transmitting and receiving at least one signal and a controller combined with the transceiver unit. The controller is constituted to transmit, to a network data analytics function (NWDAF), a message to request network analytics information for a radio access technology and frequency for each specific area, receive, from the NWDAF, the network analytics information generated based on the message, and determine a radio/frequency selection priority (RFSP) index value based on the received network analytics information. The received network analytics information is generated by the NWDAF based on information collected based on the message.

Advantageous Effects

Today the number of terminals using a mobile communication network and the number of services and applications for supporting the terminals grow exponentially. Furthermore, in order to improve the quality of a mobile communication network, the design and application of a radio network and a core network are becoming increasingly sophisticated. In such a situation, not only terminals simply using a voice call and a data service, but terminals having new forms, such as a factory, an unmanned aerial vehicle, a robot, a vehicle, and an airplane, are emerging. It is expected that such a terminal having a new form continues to increase. In order to effectively support objects of such terminals, the continuous evolution of services over a mobile communication network is also expected.

Various objects and forms of terminals are changed, whereas in a mobile communication network, all terminals currently share radio resources. In general, a core network is also operated in a form in which all terminals share the core network. Terminals have different forms and objects, and are thus different in a format in which the terminal is operated, a service used by the terminal, and an interaction with a network. Accordingly, in order to effectively support terminals having respective forms, a mobile communication network needs to maintain an optimized configuration by analyzing an object of and service requirements for each terminal. Furthermore, in order to effectively support each terminal and service, a network needs to operate to continuously provide services having a desired level at the least cost through the identification of characteristics of each terminal and the optimization and automation of a configuration and management.

The disclosure includes the support of an operation, which can automate a configuration of network apparatuses or resources so that higher-level requirements of a mobile communication network operation, such as the minimization of an energy operation, the maximization of service satisfaction, and the minimization of interference between resources, in an operation of resources necessary to provide services including resources of radio and core networks, are satisfied. The type of such resources may include a base station supporting a radio access technology, a frequency bandwidth used by a base station, transmission and reception power of a base station, etc. Currently, resources of most of mobile communications are operated without any change without a change in their configurations dynamically after being installed, and are operated by activating all resources although a user is not present or service requirements are not high. Furthermore, the type and number of such resources are increased along with the development of the technology. A cost for operating and managing resources continues to increase, and methods for supporting such an operation become more complex. Information necessary to support the automation of such a resource configuration can reduce an operating cost by identifying and predicting a service level requested by each terminal or user and operating a network by using minimum resources capable of satisfying the level. Furthermore, the absence of service provision, interference, and a phenomenon in which quality drops to a required level or less, which may occur during a change in the configuration of such a resource, may occur. The disclosure includes a method capable of preventing such a possibility by predicting the possibility in advance.

Effects which may be obtained in the disclosure are not limited to the aforementioned effects, and other technical effects not described above may be evidently understood by a person having ordinary knowledge in the art to which the disclosure pertains from the following description.

MODE FOR DISCLOSURE

Figure 1:
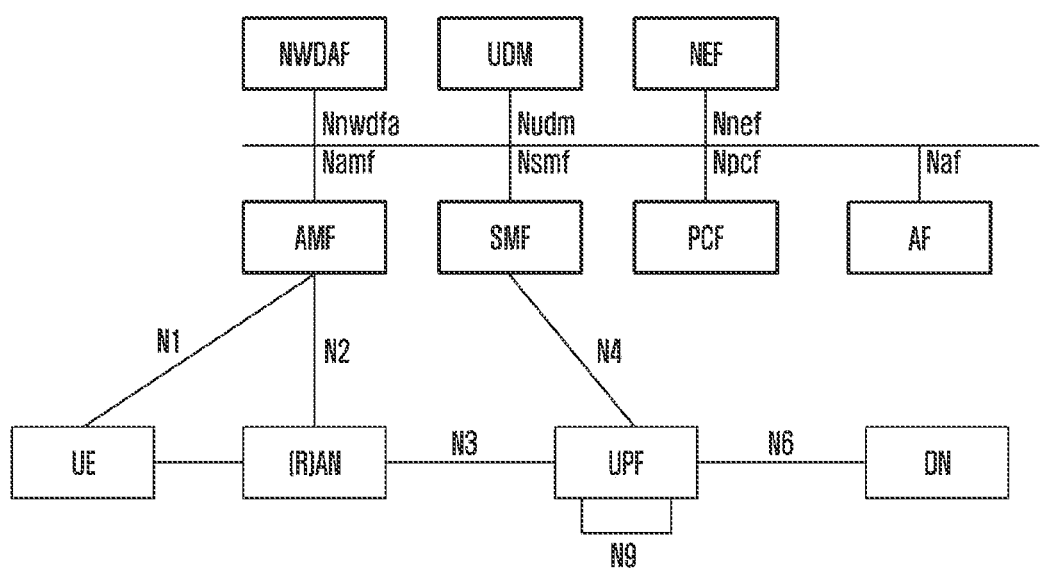
FIG. 1 is a diagram illustrating a construction of a mobile communication system and entities disposed outside a network, for disclosing the disclosure.
Figure 2:
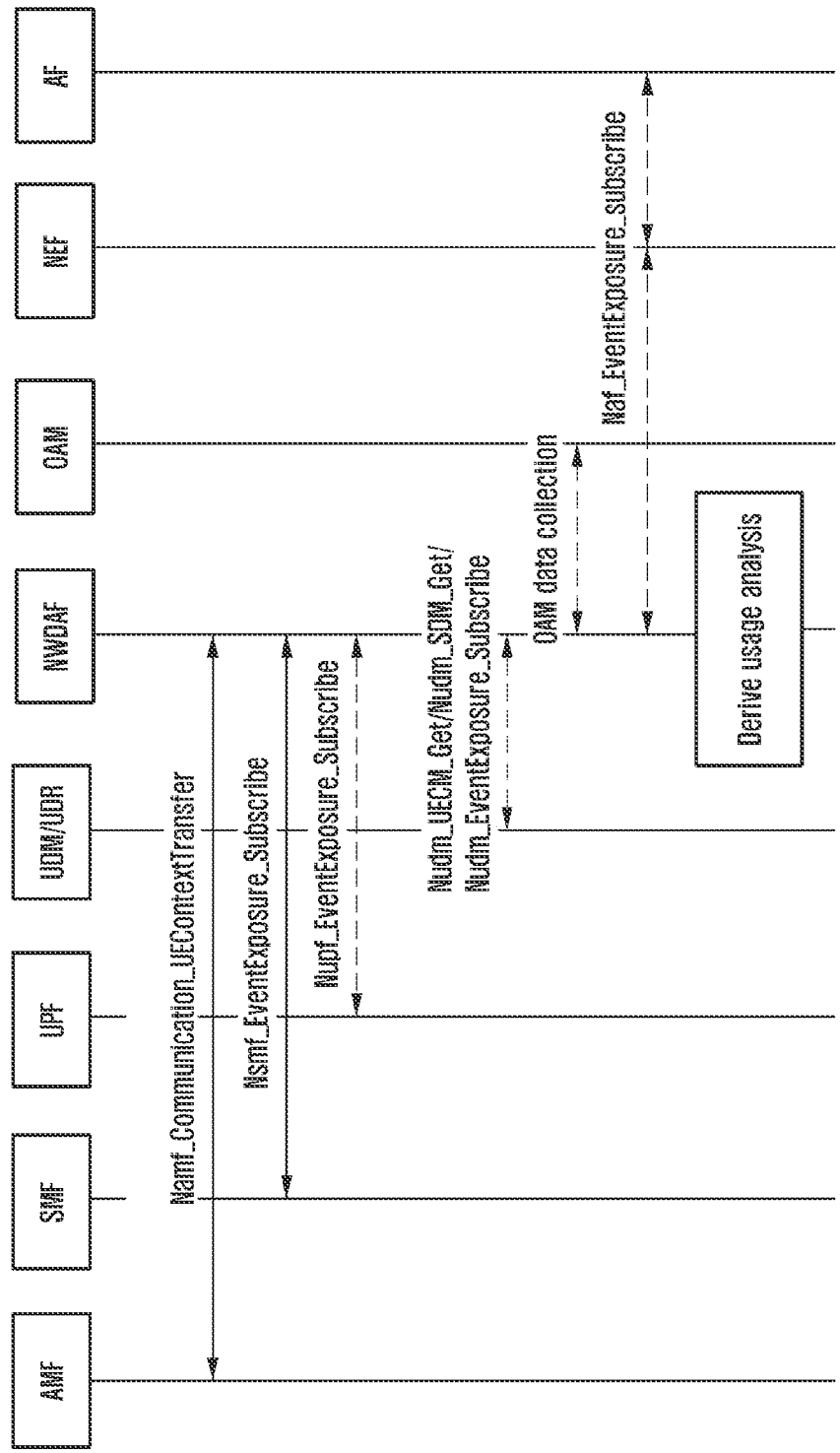
FIG. 2 is a diagram illustrating a process of collecting, by an NWDAF, information from various entities.

Hereinafter, embodiments of the disclosure are described in detail with reference to the accompanying drawings.

In describing the embodiments, a description of technology contents that are well known in the art to which the disclosure pertains and that are not directly related to the disclosure is omitted in order to clearly deliver the gist of the disclosure without obscuring the gist of the disclosure by omitting an unnecessary description.

For the same reason, in the accompanying drawings, some elements are enlarged, omitted or schematically depicted. Furthermore, the size of each element does not accurately reflect its real size. In the drawings, the same or similar elements are assigned the same reference numerals.

Advantages and characteristics of the disclosure and a method for achieving the advantages and characteristics will become apparent from the embodiments described in detail in conjunction with the accompanying drawings. However, the disclosure is not limited to the disclosed embodiments, but may be implemented in various different forms. The embodiments are provided to only complete the disclosure and to fully notify a person having ordinary knowledge in the art to which the disclosure pertains of the category of the disclosure. The disclosure is defined by the category of the claims. Throughout the specification, the same reference numerals denote the same components.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing equipment, so that the instructions executed by the processor of the computer or other programmable data processing equipment create means for executing the functions specified in the flowchart block(s). These computer program instructions may also be stored in a computer-usable or computer-readable storage memory that can direct a computer or other programmable data processing equipment to implement a function in a particular manner, such that the instructions stored in the a computer-usable or computer-readable memory produce an article of manufacture including instruction means that implement the function specified in the flowchart block(s). The computer program instructions may also be loaded on a computer or other programmable data processing equipment to cause a series of operational steps to be performed on the computer or other programmable data processing equipment to produce a computer-executed process, so that the instructions performing the computer or other programmable data processing equipment provide steps for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as a field programmable gate array (FPGA) or an application specific integrated circuit (ASIC), and the "unit" performs specific tasks. However, the term "~unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units". Furthermore, the components and "units" may be implemented to operate on one or more CPUs within a device or a security multimedia card. Furthermore, in an embodiment, "~unit" may include one or more processors.

In specifically describing embodiments of the disclosure, a new RAN (NR), that is, a radio access network, and a packet core (a 5G system, a 5G core network, or a next generation core (NG core)), that is, a core network, in the 5G mobile communication standard specified by 3GPP, that is, a mobile communication standardization group are mainly targeted, but a major subject matter of the disclosure may be slightly changed without greatly departing from the scope of the disclosure, and may be applied to other communication systems having a similar technical background. This may be determined by a person having skilled knowledge in the art to which the disclosure pertains.

Hereinafter, for convenience of description, some of terms and names defined in the 3$^{rd}$ generation partnership project long term evolution (3GPP) standard (standard for 5G, NR, LTE or a system similar thereto) may be used. However, the disclosure is not restricted by the terms and names, and may also be identically applied to systems that follow other standards.

Furthermore, a term for identifying an access node, terms to denote network entities, terms to denote messages, a term to denote an interface between network entities, terms to denote various types of identification information, etc., which are used in the following description, have been illustrated for convenience of description. Accordingly, the disclosure is not limited to the terms used in the disclosure, and another term to denote a target having an equivalent technical meaning may be used.

The disclosure relates to a method for supporting an operation of an unmanned aerial vehicle in a mobile communication system complying with the 3GPP standard. An object of the disclosure may be achieved through an interaction between apparatuses and entities described later.

Hereinafter, in the disclosure, directly related apparatuses among various components that constitute a core network are illustratively described. A construction diagram in which components interact with each other by using service-based interfaces of the components is illustrated in FIG. 1.

An access and mobility management function (AMF) is an apparatus for managing the access and mobility of a terminal. A terminal performs the role of a terminal-core network end point that connects to other apparatuses of a core network over a radio access network (RAN). Functions provided by the AMF may include functions, such as the registration, connection, reachability, mobility management, access identification/authentication, and mobility event generation of a terminal, for example.

A session management function (SMF) performs a management function for a protocol data unit (PDU) session of a terminal. For example, the SMF may perform functions, such as a session management function through the establishment, modification, or release of a session and the maintenance of a tunnel between a user plane function (UPF) and an AN, which is necessary therefor, the assignment of an IP address to a terminal and a management function therefor, an ARP proxy function, the selection and control of a user plane, traffic processing control in a UPF, and billing data collection control.

A policy control function (PCF) performs a role of determining a policy for access/mobility and session management, which are applied in the AMF and the SMF. For example, the PCF governs a behavior of the entire network, and may provide policies that need to be executed on network functions (NFs) constituting a control plane. Furthermore, the PCF may access information related to a policy determination by accessing a unified data repository (UDR).

A network exposure function (NEF) is responsible for a function for delivering, to the outside, or receiving an event occurring in a mobile communication network and a capability supported by the mobile communication network. For example, the NEF performs a function for the safe provisioning of information of an external application to a core network and functions, such as the conversion of inside/outside information and the redistribution of a function received from another NF after storing the function in the UDR.

Unified data management (UDM) and a unified data repository (UDR) are independent network functions, but are simultaneously described because functions and roles thereof are similarly used in the present embodiment. The UDM may perform the generation of authentication and key agreement (AKA) authentication information for 3GPP security, the processing of a user ID, the reverse concealment of a subscriber concealed ID (SUPI), the management of lists of the NF currently supporting a UE, subscriber information (subscription) management, SMS management, etc., for example. The UDR may perform a function for storing and providing subscriber information managed by the UDM, structured data for exposure, application data associated with the NEF or a service, for example.

A user plane function (UPF) performs a role of actually processing user data, and performs a role of delivering, to an external data network, a packet generated by a terminal or processing a packet so that data introduced from an external data network can be delivered to a terminal. Major functions provided by the UPF may include functions, such as the execution of a role as an anchor between radio access technologies, the provision of connectivity between a PDU session and an external data network, packet routing and forwarding, packet inspection, the application of a user plane policy, the writing of a traffic use report, and buffering, for example.

A network data analytics function (NWDAF) may collect an event or information occurring within a network, and may deliver, to an NF, an AF, or OAM, statistics, prediction, or recommendation information related to specific information by using an analysis tool or a tool, such as machine learning. For example, the NWDAF may perform functions, such as the collection of data from the NF/AF/OAM, the registration of an NWDAF service and metadata exposure, the provision of network analytics information to the NF/AF.

A UE radio capability management function (UCMF) performs a function for storing and providing, in a dictionary form, mapping information between the ID of a radio access-related function of a terminal assigned by a public land mobile network (PLMN) or assigned by a manufacturer and an actual function.

The application function (AF) performs a function interlocking with a core network of 3GPP in order to provide services. The AF may be basically divided "Trusted" and "Untrusted." A trusted AF may use services of network functions disposed within a core network without a separate intermediate function, such as the NEF. Representatively, functions provided by the AF may include application influence on traffic routing, network information exposure function utilization, a policy framework and interaction for policy control, an IMS-related interaction, etc.

The operation, administration and maintenance (OAM) is an apparatus for managing an overall mobile communication network including a base station and a core network. For example, the OAM may perform functions related to an operation, management, maintenance, provisioning, problem solving, etc. of a communication network. Furthermore, the OAM may perform a function for monitoring and configuring functions of each base station or a core network so that the functions smoothly operate according to the design and policy. The OAM is a concept including all of tools, procedures, etc. related to management, and does not denote a specific apparatus, but may include all tools, software, procedures, etc. which are used by a network manager for management.

A representative factor provided as a method for supporting the management of a wireless resource or a radio resource in a mobile communication network includes a radio/frequency selection priority (RFSP) index value. The value is a value which may be delivered from the AMF to the RAN through an interface, that is, N2, in a core network. The value may be used for the RAN to determine an RRM strategy depending on its value. A configuration object of the value may be used to give priority between cells in selecting a cell by a terminal in an Idle mode, or may be used for a terminal in an activated or connected mode to select a radio access technology (RAT) or determine another frequency band. The value may be differently configured in a UE-specific way or may be configured by taking network slice information into consideration. As a representative method of configuring the value, the value may be obtained in a process of configuring, in a network, the value for subscriber information managed by the UDM that manages subscriber information and generating, by the AMF, UE context. In this case, the value may be a value autonomously configured by a network operator.

In order to change or dynamically configure an RFSP index value, the AMF may establish a connection related to an access and mobility (AM)-related policy during a registration process of a terminal, and may deliver, to the PCF, an RFSP index value previously received from the UDM. The PCF that has received the delivered RFSP value may newly determine an RFSP index value optimized for an operation of a network with a terminal that has requested registration by using autonomously collected information, and may deliver the value to the AMF. In this process, in order to determine the RFSP index value of the terminal, the PCF may take into consideration the type of voice or data-centered usage (Usage Type) of the terminal that is delivered by the terminal in the registration process, the existing accumulated usage history of the terminal, load information of a slice, etc. The newly generated RFSP index value may be internally updated in the AMF, and a value thereof may be delivered to the RAN.

The disclosure includes a method of supporting that the NWDAF can configure an optimal value by taking into consideration a service usage history of a terminal and a current situation of a network in addition to information that is previously used in determining an RFSP index value by the PCF or the AMF. In order to support the method, the disclosure includes a method of collecting, by the NWDAF, data necessary to generate related analytics information, a method of providing analyzed information, and a method of using, by the NF that has requested analytics information, the analytics information.

A procedure, an interface, and a protocol defined in the 3GPP standard document are used for the exchange of information and the exchange of control signals between the aforementioned entities. However, all terms included in the disclosure are not limited to 3GPP terms and names and may be identically applied to a system and apparatus which follow another standard. In specifically describing embodiments of the disclosure, a communication standard whose standard has been determined by 3GPP will be a major target, but a major subject matter of the disclosure may be slightly changed without greatly departing from the scope of the disclosure, and may be applied to other communication systems having a similar technical background. This may be determined by a person having skilled knowledge in the art to which the disclosure pertains.

[First Embodiment]—Method of Collecting, by the NWDAF, Terminal or Network-Related Information As described above, the network data analytics function (NWDAF) may perform the function of collecting various data generated in a network, processing data collected by using various methods such as a statistical scheme or machine learning, and providing statistical information or prediction information related to network analytics information. Representative analytics information provided by the NWDAF includes load information of a slice, load information of a specific network function (NF), a moving route of a specific terminal, etc. In this case, a value of the analytics information may be a statistical value collected from the past to the present, and may be a prediction value related to specific future timing.

Core analytics information of information provided in the disclosure may be basically classified into two types. Information corresponding to the first classification may be related to service usage information and radio access information of a terminal that is the subject of analysis. The NWDAF may analyze information, such as the type of service commonly used by the existing terminal, network performance requirements of a terminal, an RAT or frequency bandwidth preferred by a terminal, and a service utilization pattern. Accordingly, a value of network quality or an experience that is actually felt by a terminal or user in a specific network situation can be derived. Information corresponding to the second classification may be a specific radio access technology (EUTRA or NR) in a specific area, the number of UEs using a specific frequency band (a low frequency band or a low frequency band), and expected information. The NWDAF may collect and analyze a specific radio access technology (EUTRA or NR) in a specific area, the number of UEs using a specific frequency band (a low frequency band or a low frequency band), expected information, etc.

Information that is additionally provided in association with the aforementioned information may be re-processed in two forms. The first form includes whether a service level of a specific terminal can be satisfied when the terminal moves to a specific RAT or a specific frequency band and an analytics or expectation value related to service quality or a service experience accordingly. In this case, a specific terminal may be a prediction value for a specific location and timing. The second form includes whether terminals disposed in a specific area can be moved to a specific RAT or frequency band and an analytics or expectation value related thereto.

Table 1 includes information collected by the NWDAF from the NF within a core network. Table 2 includes information collected through the OAM. Table 3 includes and describes information collected through the AF. The information collected by the NWADF from the core network is access and mobility (AM) management-related information and session management (SM)-related information of a specific terminal, and has an object for collecting, by a terminal, present situation information of a network service now being used by the terminal by collecting function information through which the terminal can now interact with the core network, location information, and session-related information.

TABLE 1

| Name | Provider | Description |
|---|---|---|
| Terminal location information (Location) | AMF | Location information of a specific terminal. Collected through UE context or event subscription. |
| Terminal radio capability information | AMF/ UCMF | A list of radio access-related functions supportable by a terminal. The information is included in UE context of the AMF. If information is represented as an ID, the information may be collected through the UCMF. |
| Configured RFSP index value | AMF | A value included in UE context of the AMF. A currently configured RFSP index value of a specific terminal |
| Terminal subscriber information | UDM | Terminal subscriber information. The information may include an RFSP value configured by an operator. |
| S-NSSAI | AMF/SMF | Slice information of a specific terminal |
| DNN | SMF | Usage data network information of a specific terminal |
| Traffic filter information | SMF | Information that is used to classify traffic used by a specific terminal. The information may be represented as a filter having another form depending on the type of PDU session, such as an IP and Ethernet. |
| QoS Flow Bit Rate | UPF or SMF | A bit rate of a QoS Flow of a terminal. The bit rate is directly collected from the UPF or is collected based on a report for each QoS Flow through the SMF. The bit rate may be collected by dividing a direction into the upward and the downward. |
| Packet transmission count | UPF or SMF | The number of packets delivered in a QoS Flow of a terminal. The number of packets may be collected by dividing a direction into the upward and the downward. |

The information collected through the AM is information related to abase station that provides a radio access technology, and is collected in order to provide analytics information to a specific terminal or a specific area. The pieces of information may be correlated and used to generate information for determining the type of RAT provided in a specific area and quality for each situation of a radio access network.

TABLE 2

| Name | Provider | Description |
|---|---|---|
| Tracking area identifier | OAM | An identifier of a tracking area to which a specific base station belongs (tracking area identifier) |
| eNB or gNB identifier | OAM | An identifier of a specific eNB or gNB. A global eNB ID or gNB ID may be collected. |
| Cell ID | OAM | An identifier by which a specific cell may be identified. An E-UTRA cell global identifier (ECGI) and an NR cell global identifier (NCGI) may be collected. |
| Reference Signal Received Power | OAM | The intensity of a received signal measured for each terminal. |
| Reference signal received quality | OAM | Signal quality measured for each terminal. |
| Signal-to-noise and interference ratio | OAM | A ratio between a received signal and noise and an interference ratio for each terminal. |

The AF may provide a function for providing information related to the provision of a specific service or affecting an interface for changing factors related to service provision by invoking the interface. The disclosure may include a method of collecting information for generating information for analyzing a service type and quality for a specific application, which are provided by the AF.

TABLE 3

| Name | Provider | Description |
|---|---|---|
| Application ID | AF | An identifier that is used to identify a specific application |
| Service experience | AF | A quality level felt by a terminal in using a specific application. Representatively, information, such as mean of opinion (MoS), is present. |

FIG. 1 illustrates a procedure of collecting the three types of information from entities disposed inside and outside a core network.

Information collected by the NWDAF may be classified into three types as the type of subject of collection as described above. A method that is used to collect information may also be different depending on the type of information collection. If information is collected from the AMF, the SMF, the UPF, UCMF, or the UDM, newly generated information or changed information may be collected by using a method of receiving an related event based on an event exposure structure provided to the core network. Additionally, UE context or subscriber information managed within the AMF or the UDM may be collected though a service. The service may have a form, such as Namf_communication_UEContextTransfer, Nudm_SDM_get. In order to specify a specific NF instance that supports a specific terminal, an Nudm_UECM_get service provided by the UDM may be used. A process of collecting information from the OAM, which corresponds to the second classification, uses an interface provided by the OAM, and may be used to collect information collected in the RAN or configuration values. Representatively, if the OAM invokes an exposed subscription service and receives a related output value and a specific file has been generated, information may be collected from the OAM in a way, such as transmitting a file. In such a process, the information may be transmitted or collected by using a method specified in TS 28.532 of 3GPP or a method that has not been standardized. Finally, in order to collect information from the AF disposed outside the core network, specific factors may be changed via the NEF, and information provided by the AF may be collected. An identifier (SUPI), location information, etc. of a specific terminal may be representatively used as a factor that is used to collect each of pieces of information. The location information may include a tracking area identifier (TAI), a tracking area code (TAC), a cell Id, etc. Additionally, in order to associate pieces of information changed for each time, a timestamp that represents a specific time zone may be collected in addition to each piece of collected information. In collecting information for each entity, priority is not present, and the priorities may be simultaneously collected or the information may be collected in order different from the illustrated order.

[Second Embodiment]—Method of Providing, by the NWDAF, Service Utilization Information-Centric Network Analytics Information of a Terminal The disclosure includes a method of delivering, to a consumer who has requested network analytics information provided by the NWDAF, usage-related analytics information of a terminal based on collected information. An object of providing this network analytics information is for identifying a characteristic of a network service that is commonly required by a terminal by analyzing a usage pattern of the terminal. Such information may be used to determine whether a service whose connectivity, such as a call, is important is used and whether a bandwidth necessary upon service request, such as data communication, can be provided. The output of network analytics information provided in the disclosure has been specifically described in Table 4.

TABLE 4

| Name | Description |
| --- | --- |
| S-NSSAI | Information on a slice used by a terminal |
| Data network name (DNN) | Information on a data network used by a terminal |
| UE Identifier | An identifier that is used to identify a UE. In general, an SUPI may be used. A GPSI, etc. may be instead used. |
| UE Usage Type | A type form of a UE. A usage form may be divided into a voice-centric form or a data-centric form. |
| Media Type | Information on a media type of a service chiefly used by a terminal. The media type may be divided into forms, such as text, an audio, an image, video, a message, and a call. A type defined in RFC6838 may be used or a value randomly configured by a network operator may be used. Ratio information for each type may be provided by expanding the type. For example, the ratio may be provided in the form of [text: 10%, an audio: 70%, video: 20%]. In this case, an audio may be provided as a representative media type. |
| Mobility type | Identifying information indicative of a mobility form of a terminal. The mobility type may be represented as classification, such as stationary, light mobility, frequent mobility, or fast mobility. |
| Average Bandwidth | A bandwidth averagely used by a terminal |
| Maximum Bandwidth | A bandwidth used by a terminal to the maximum |
| Application list | A list of applications chiefly used by a terminal. The applications may be represented through application IDs. Additionally, usage or a usage ratio for each application may be provided. |
| 5QI list | A list of 5QI values capable of satisfying a service utilization form of a terminal by taking the service utilization form into consideration. |

Figure 3:
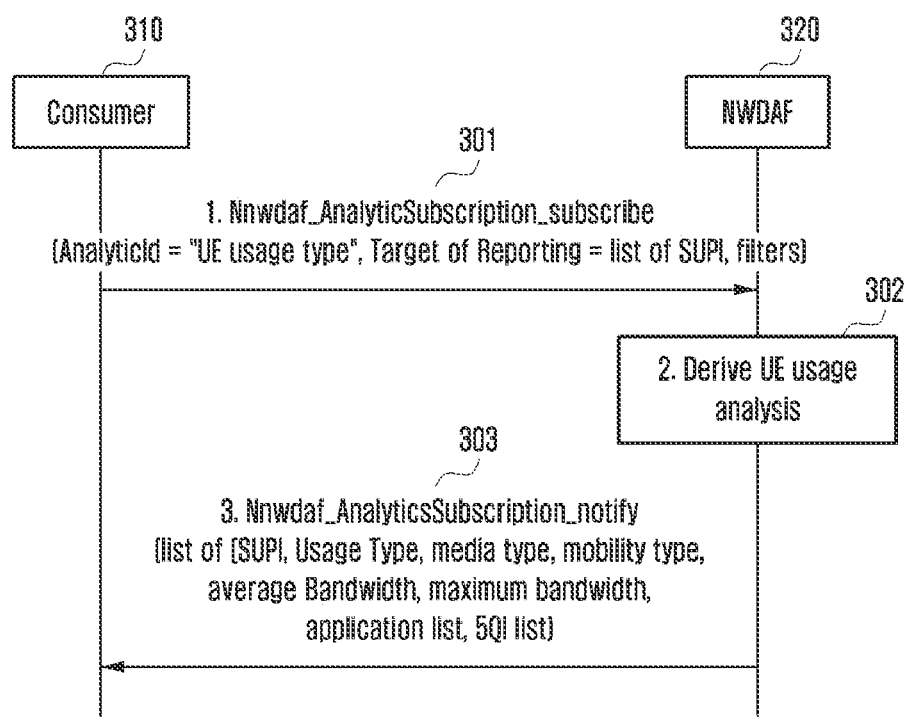
FIG. 3 is a diagram illustrating a process of providing, by the NWDAF, a consumer with usage-related analytics information for each terminal.

FIG. 3 is illustrated in relation to Table 4. FIG. 3 illustrates a process of providing, by the NWDAF, a consumer with usage-related analytics information for each terminal.

Only information in Tables 1 and 2 may be used as information that is used to generate the analytics information in the first embodiment.

Step 301—a consumer 310 may request service usage information for a list of specific terminals through a message provided by an NWDAF 320. The message may be Nnwadf_AnalyticsSubscription_subscribe. In this case, information related to the time may be additionally delivered in filter information for limiting and providing information used by a terminal in a specific interval or at specific future timing. In this process, if information is necessary on a one-off basis, Nnwdaf_AnalyticInfo_Request may be used instead of Nnwadf_AnalyticsSubscription_subscribe.

Step 302—the NWDAF 320 may collect information necessary to provide the requested terminal usage analytics information, and may generate analytics information based on the information. In this case, if terminal-related information is previously collected, a process of collecting network information may be omitted.

Step 303—the NWDAF 320 may deliver the generated analytics information to the consumer 310 who has requested the analytics information. In the case of subscription in step 301, the analytics information may be delivered whenever a condition in which notification is delivered is satisfied. Furthermore, if analytics information has been requested on a one-off basis by using AnalyticInfo_Regeust, the process may be terminated after notification related to the analytics information is transmitted once.

Figure 4:
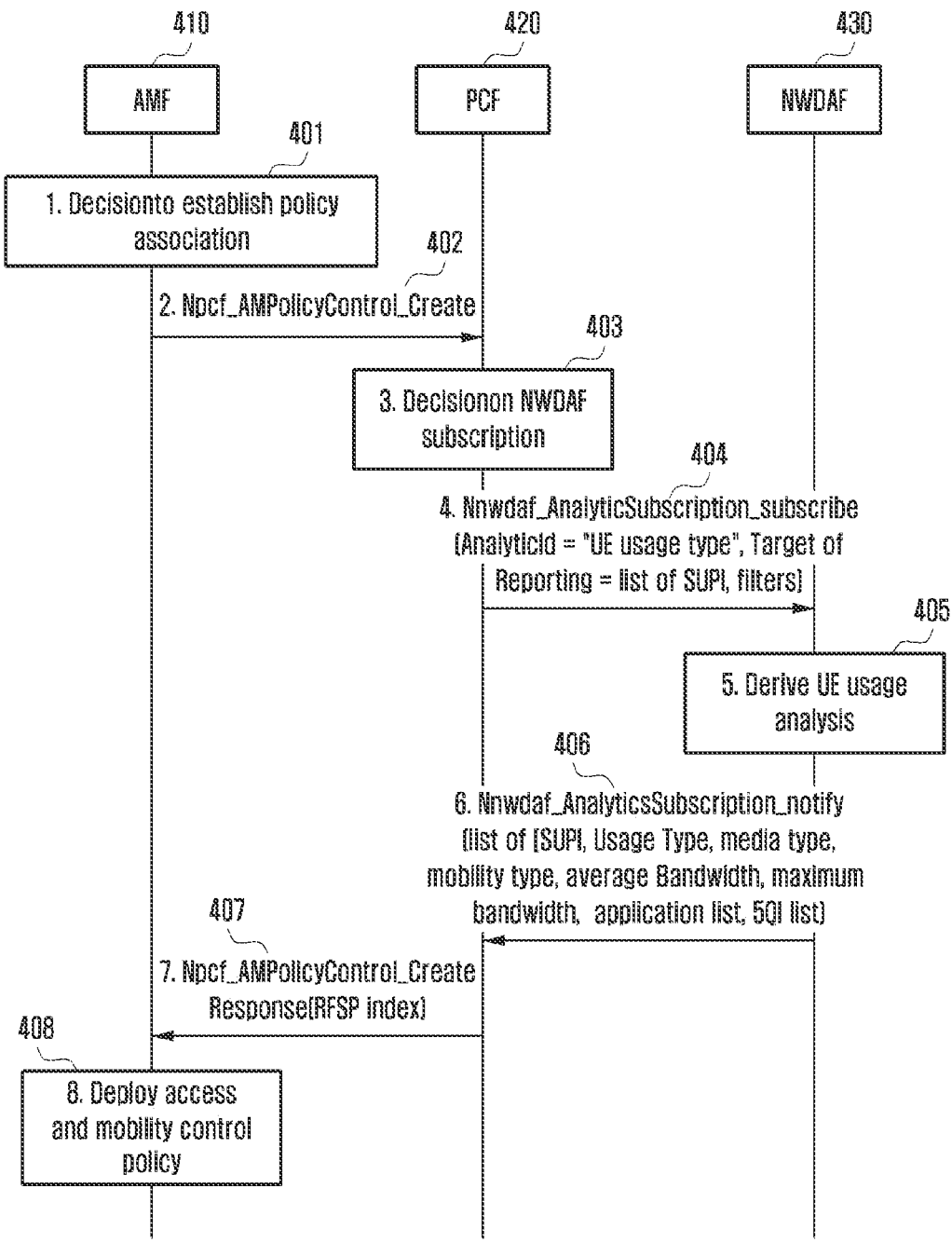
FIG. 4 is a diagram illustrating a process of configuring, by a PCF, an RFSP index value by using analytics information provided by the NWDAF.

[Third Embodiment]—Method of Using, by a Terminal, Service Utilization Information-Centric Network Analytics Information The disclosure includes a method using the second embodiment. The disclosure includes a method of generating, by the PCF, an RFSP index value by using network analytics information provided by the NWDAF. In the disclosure, the PCF has been described as a consumer of the NWDAF, but the same method may be used through the AMF. A procedure for the disclosure is illustrated in FIG. 4. FIG. 4 illustrates a process of configuring, by the PCF, an RFSP index value by using analytics information provided by the NWDAF.

Step 401—an AMF 410 may recognize that the establishment of AM association with the PCF 420 is necessary in order to receive an association for an access and mobility (AM)-related policy with the PCF 420 upon initial registration of a terminal or due to the occurrence of a change in the AMF.

Step 402—the AMF may select a proper PCF based on a PCF selection policy, and may generate an AM-related policy association with the PCF.

Step 403—the PCF 420 may recognize that network analytics information of an NWDAF 430 is necessary in order to determine an RFSP index value. In this case, in the necessity of the PCF 420 for the configuration of an RFSP Index value, the PCF 420 may be configured to always receive analytics information from the NWDAF 430 according to an internal policy. Optionally, in order to process a case where known usage information of a terminal is not present or a case where a specific slice is in a congested situation, analytics information of a terminal may be requested from the NWDAF 430. Additionally, an operator may request, from the NWDAF 430, service usage analytics information of a terminal as a part of the application of a policy, such as the optimization of network energy, the maximization of network performance, or the maximization of consumer service experiences, to the PCF 420 according to an internal policy.

Step 404—the PCF 420 may request service usage information for a list of specific terminals through a message provided by the NWDAF 430. The message may be Nnwadf_AnalyticsSubscription_subscribe. In this case, information related to the time may be additionally delivered in filter information for limiting and providing information used by a terminal in a specific interval or at specific future timing. In this process, if information is necessary on a one-off basis, Nnwdaf_AnalyticInfo_Request may be used instead of Nnwadf_AnalyticsSubscription_subscribe.

Step 405—the NWDAF 430 may collect information necessary to provide the requested terminal usage analytics information, and may generate analytics information based on the collected information. In this case, if terminal-related information is previously collected, a process of collecting network information may be omitted.

Step 406—the NWDAF 430 may deliver the generated analytics information to a consumer that has requested the analytics information. In the case of subscription in step 401, the analytics information may be delivered whenever a condition in which notification is delivered is satisfied. If the analytics information has been requested on a one-off basis by using AnalyticInfo_Request, the process may be terminated after notification related to the analytics information is transmitted once.

Step 407—the PCF 420 may generate an RFSP index value based on the network analytics information provided by the NWDAF 430, and may deliver the network analytics information to the AMF 410. The PCF 420 may be used to determine whether a service being used by a terminal in a specific radio access technology or frequency band is smoothly used or to determine whether service quality has been deteriorated, which may occur when an RFSP value of a specific terminal is changed, based on the service usages information of the terminal delivered by the NWDAF 430.

Step 408—the AMF 410 may store the received RFSP index value in UE context and deliver the RFSP index value to an RAN, etc.

[Fourth Embodiment]—Method of Providing Radio Access Technology and Frequency Band Usage Network Analytics Information for Each Area The disclosure may include a method of providing, by the NWDAF, network analytics information related to radio network usage, which has been requested by a consumer for each interested area. The analytics information provided may include the total number of UEs being used in each area, the number of UEs used for each radio access technology (RAT), or the number of UEs used for each frequency band. Additionally, the analytics information may include the number of off-loadable UEs to another radio access technology or another frequency band. A consumer may check the number of UEs being used for each specific radio access technology or frequency based on such analytics information, and may use prediction information relating to the number of UEs by additionally taking into consideration the mobility of a terminal at specific timing. Table 5 may include output information of analytics information for each radio access technology and frequency band for each area.

TABLE 5

| Name | Description |
| --- | --- |
| Total Number of UEs | The total number of UEs that are accessing a specific area |
| Number of UEs per RAT | The number of UEs (being used for each radio access technology (RAT). The radio access technology may include E-UTRA, NR, a GERAN, etc. The type of radio access technology may be different for each mobile communication network. |

TABLE 5-continued

| Name | Description |
|---|---|
| Number of UEs per frequency | The number of UEs being used for each frequency band. The frequency band may be different for each mobile communication network. Additionally, frequency band information for each RAT may be included. For example, a frequency band dependent on a specific RAT, such as (NR, 3.0 GHz - 3.5 GHz, 10 in number), may be explicitly represented. |
| Number of off-loadable UEs to other RAT | The number of off-loadable UEs from a radio access technology that is being used to another radio access technology. Additionally, the off-loadable UE may be represented in the form of the existing radio access technology and a previous access technology. For example, the off-loadable UE may be represented as a format of (NR -> E-UTRA, 10 in number). |
| Number of non-off-loadable UEs to other RAT | The number of non-off-loadable UEs from a radio access technology that is being used to another radio access technology. Additionally, the non-off-loadable UE may be represented in the form of the existing radio access technology and a previous access technology. For example, the non-off-loadable UE may be represented as a format of (NR, 10 in number). |
| Number of off-loadable UEs to other frequency | The number of off-loadable UEs from a frequency band that is being used to another frequency band. The frequency band may be additionally represented along with a specific RAT by taking into consideration a case where the frequency band is dependent on the RAT. For example, the frequency band may be represented as a format of [(NR, 28.0 GHz-28.5 GHz) -> (NR, 3.0 GHz-3.5 GHz), 10 in number]. |
| Number of non-off-loadable UEs to other frequency | The number of non-off-loadable UEs from a frequency band that is being used to another frequency band. The frequency band may be additionally represented along with a RAT by taking into consideration a case where the frequency band is dependent on the RAT. For example, the frequency band may be represented as a format of [(NR, 28.0 GHz-28.5 GHz), 10 in number]. |
| Total Data Rate | The amount of transmission per time, which occurs in the entire radio communication network. If a specific interval is given, the amount of transmission may be replaced with a data volume. |
| Data Rate per RAT | The amount of data transmission per time for each radio access technology. If a specific interval is given, the amount of data transmission may be replaced with a data volume. |
| Data Rate per Frequency band | The amount of data transmission per time for each frequency band. If a specific interval is given, the amount of data transmission may be replaced with a data volume. |

Figure 5:
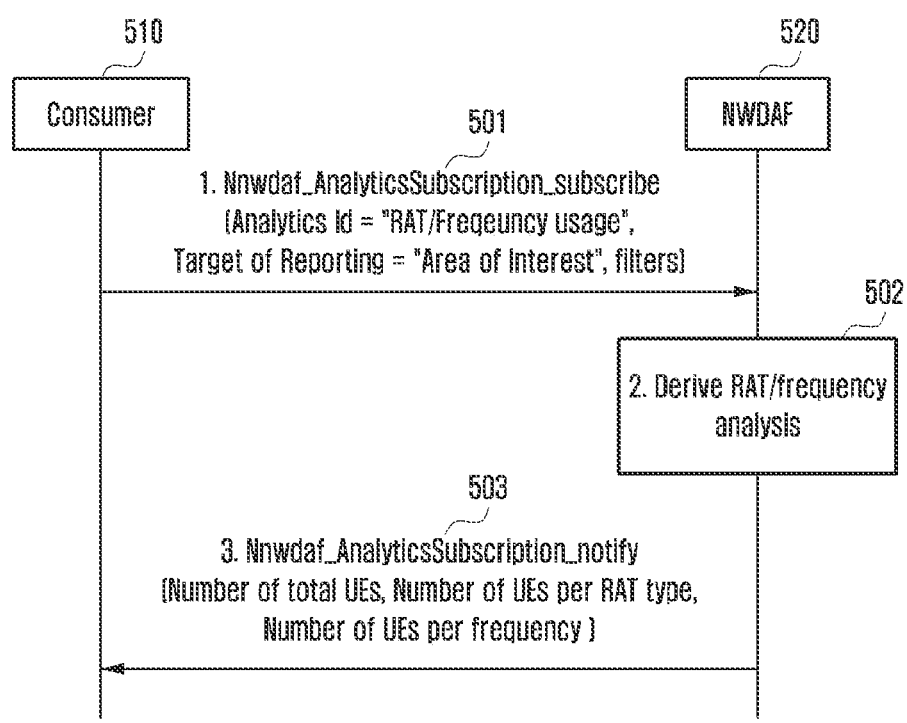
FIG. 5 is a diagram illustrating a procedure of providing, by the NWDAF, analytics information related to a radio access technology and frequency band for each area.

A disclosure relate to Table 5 is illustrated in FIG. 5. FIG. 5 illustrates a procedure of providing, by the NWDAF, analytics information related to a radio access technology and frequency band for each area. Only information in Tables 1 and 2 may be used as information that is used to generate the analytics information in the first embodiment.

Step 501—a consumer 510 may request network analytics information for a radio access technology and frequency for each specific area through a message provided by an NWDAF 520. The message may be Nnwadf_AnalyticsSubscription_subscribe. In this case, information related to the time may be additionally delivered in filter information for limiting and providing information used by a terminal in a specific interval or at specific future timing. Additionally, if only analytics information on a specific RAT or frequency band is necessary, the specific RAT or frequency band may be included in a filter. In this process, if the information is necessary on a one-off basis, Nnwadf_AnalyticInfo_Request may be used instead of Nnwadf_AnalyticsSubscription_subscribe.

Step 502—the NWDAF 520 may collect information necessary to provide the requested network analytics information for the radio access technology and frequency for each area, and may generate the analytics information based on the information. In this case, if terminal-related information is previously collected, a process of collecting network information may be omitted.

Step 503—the NWDAF 520 may deliver the generated analytics information to the consumer who has requested the analytics information. In the case of subscription in step 501, the analytics information may be delivered whenever a condition in which notification is delivered is satisfied. If the analytics information has been requested on a one-off basis by using AnalyticInfo_Regeust, the process may be terminated after notification related to the analytics information is transmitted once.

Figure 6:
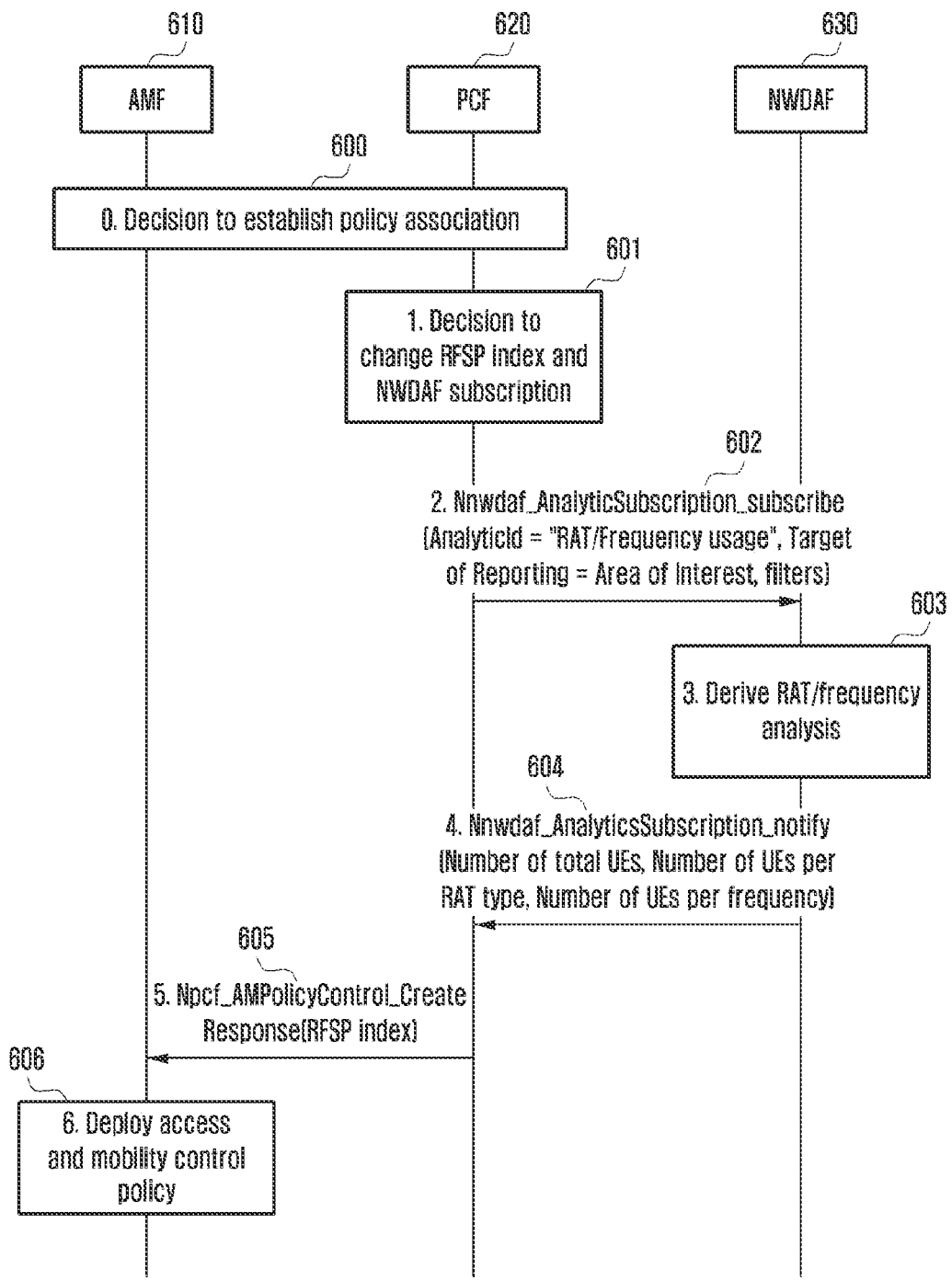
FIG. 6 is a diagram illustrating a process of configuring, by the PCF, an RFSP index value by using analytics information for each area, which is provided by the NWDAF.

[Fifth Embodiment]—Method of Using, by the PCF, Radio Access Technology and Frequency Band Usage Network Analytics Information for Each Area FIG. 6 is a diagram illustrating a process of configuring, by the PCF, an RFSP index value by using analytics information for each area, which is provided by the NWDAF.

The disclosure may include a method of changing, by the PCF 620, an RFSP index value by using analytics information for radio access technology and frequency band usage information for each area, which is provided by the NWDAF 630 in the fourth embodiment.

Step 600—an AMF 610 may use an AM_PolicyControl-related service in order to exchange AM-related policy information with a PCF 620. In this case, a relation between the AMF 610 and the PCF 620 may be initially registered by a specific terminal or terminals that are previously registered may not be distinguished from each other.

Step 601—the PCF 620 may recognize that RFSP index values of managed terminals need to be changed. To recognize such a change may be based on an internal policy of the PCF, a policy of an operator, or a policy received from an OSS/BSS. Although to make such a determination departs from the scope of the disclosure, an object of a policy related to a change in the RFSP index value may be for achieving objects from various operation viewpoints, such as a reduction of energy of a terminal, a reduction of energy of a base station, the maximization of service quality of a terminal, the maximization of the mobility of a terminal, and the minimization of an area time of a terminal. In this case, in achieving such an object, the PCF 620 may determine that radio access technology and frequency band usage analytics information for each area of the NWDAF 630 is used.

Step 602—the PCF 620 may request network analytics information for a radio access technology and frequency for each specific area through a message provided by the NWDAF 630. The message may be Nnwadf_AnalyticsSubscription_subscribe. In this case, information related to the time may be additionally delivered in filter information for limiting and providing information used by a terminal in a specific interval or at specific future timing. Additionally, if only analytics information for a specific RAT or a specific frequency band is necessary, the specific RAT or frequency band may be included in a filter. In this process, if the information is necessary on a one-off basis, Nnwdaf_AnalyticInfo_Request may be used instead of Nnwadf_AnalyticsSubscription_subscribe.

Step 603—the NWDAF 630 may collect information necessary to provide the requested network analytics information for a radio access technology and frequency for each area, and may generate the analytics information based on the information. In this case, if terminal-related information is previously collected, a process of collecting network information may be omitted.

Step 604—the NWDAF 630 may deliver the generated analytics information to the PCF 620 that has requested the analytics information. In the case of subscription in step 601, the analytics information may be delivered whenever a condition in which notification is delivered is satisfied. If the analytics information has been requested on a one-off basis by using AnalyticInfo_Regeust, the process may be terminated after notification related to the analytics information is transmitted once.

Step 605—the PCF 620 may select an RFSP index value that is most optimized so that a specific terminal achieves an object of an operation. For example, if most of service consumers do not require a network bandwidth having a high level, the consumers may be induced to use E-UTRA in a way to reduce consumers of NR by changing RFSP index values of terminals. Likewise, if a terminal using a high frequency band (mmWave) can be supported in a low frequency band or another RAT, the terminal may be induced to move to another radio access technology or frequency band by changing an RFSP index value. The PCF 620 may deliver, to the AMF 610 supporting a corresponding terminal, an RFSP index value newly calculated for each terminal.

Step 606—the AMF 610 may store the newly received RFSP index value in UE context, and may deliver the value in a RAN, etc. according to a procedure.

Figure 7:
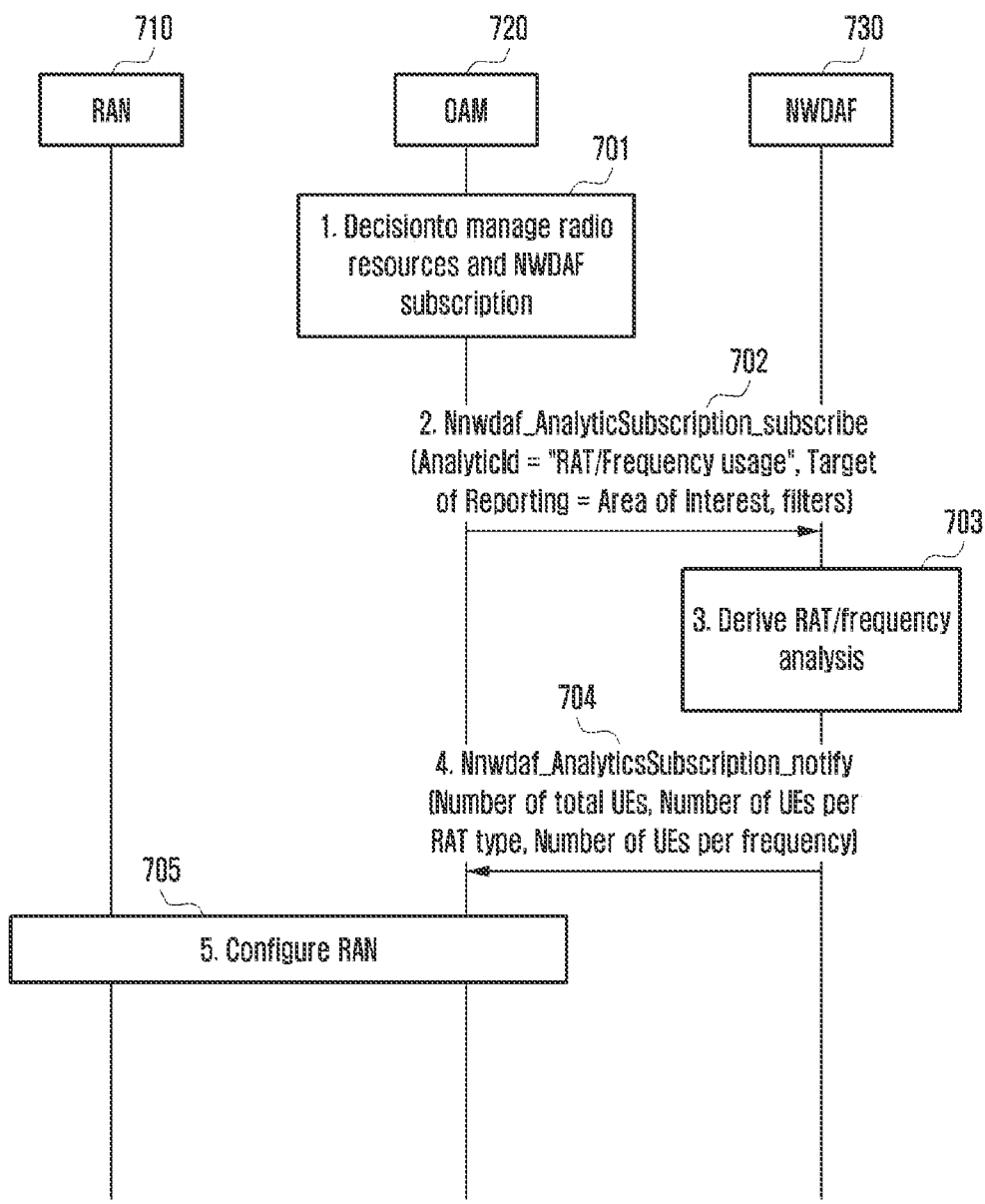
FIG. 7 is a diagram illustrating a process of managing, by an OAM, a radio resource by using analytics information for each area, which is provided by the NWDAF.

[Sixth Embodiment]—Method of Using, by the OAM, Radio Access Technology and Frequency Band Usage Network Analytics Information for Each Area The disclosure may include a method of managing, by the OAM, a specific base station or radio resource by using usage information for each radio access technology and frequency band, which is provided by the NWDAF. The OAM may be responsible for a role of managing and configuring network infrastructure, a base station, and pieces of core network equipment. Representative functions managed by the OAM in relation to a base station may be the management of power of a base station, frequency management, a mode change, the management of various configuration values, etc. The disclosure describes an operation of cutting off or applying, by the OAM, power of a specific base station and an operation for a method of configuring, by the OAM, a base station when interference attributable to a change in the environment occurs. A procedure for the disclosure is illustrated in FIG. 7. FIG. 7 illustrates a process of managing, by the OAM, a radio resource by using analytics information for each area, which is provided by the NWDAF.

Step 701—OAM 720 may determine subscription to radio access technology and frequency band usage-related analytics information for each area, which is provided by an NWDAF 730, in order to check a present situation for the usage of a radio resource for a specific area so as to achieve the aforementioned objects, such as a reduction in energy, the minimization of interference with a radio resource, and the maximization of service feeling quality of a terminal.

Step 702—the OAM 720 may request network analytics information for a radio access technology and frequency for each specific area through a message provided by the NWDAF 730. The message may be Nnwadf_AnalyticsSubscription_subscribe. In this case, information related to the time may be additionally delivered in filter information for limiting and providing information used by a terminal in a specific interval or at specific future timing. Additionally, if only analytics information for a specific RAT or a specific frequency band is necessary, the specific RAT or frequency band may be included in a filter. In this process, if the information is necessary on a one-off basis, Nnwdaf_AnalyticInfo_Request may be used instead of Nnwadf_AnalyticsSubscription_subscribe. If the number of UEs using a specific radio access technology or frequency band drops to a given value or less or increases to a given value or more, the OAM 720 may configure a filter which enables notification to be received.

Step 703—the NWDAF 730 may collect information necessary to provide the requested network analytics information for a radio access technology and frequency for each area, and may generate the analytics information based on the information. In this case, if terminal-related information is previously collected, a process of collecting network information may be omitted.

Step 704—the NWDAF 730 may deliver the generated analytics information to the OAM 720 that has requested the analytics information. In the case of subscription in step 701, the analytics information may be delivered whenever a condition in which notification is delivered is satisfied. If the analytics information has been requested on a one-off basis by using AnalyticInfo_Request, the process may be terminated after notification related to the analytics information is transmitted once.

Step 705—the OAM 720 may identify that consumers of a specific radio access technology or frequency band are currently configured to a given value or less or more. If analytics information at future timing for the number of consumers has been requested from the NW DAF 730, the OAM 720 may additionally take a determination into consideration by using the analytics information. For example, if the number of UEs that now use NR is not present and a terminal using NR within one hour is not expected, the OAM 720 may reduce power by cutting off the power source of a base station that supports NR. After making a determination on base station-related configuration information, the OAM 720 may deliver the configuration information to a RAN or take a specific action through an internal method.

[Seventh Embodiment]—Method of Reducing Base Station Power Usage by Using Network Analytics Information The disclosure may include a method of reducing power usage by cutting off the power source of a base station or frequency-related apparatus, which is not used, in a way to induce terminals using a mobile communication network in a specific area to use a specific radio access technology or frequency band by changing RFSP index values of the terminals, by using usage analytics information and radio access technology and frequency band usage analytics information for each terminal, which are provided by the NWADF.

In the disclosure, radio usage analytics information may be newly defined by integrating the aforementioned usage analytics information and radio access technology and frequency band usage information for each terminal. The NWDAF may provide the analytics information, which provides information corresponding to Table 5 with respect to a specific area and additionally simultaneously provides information corresponding to Table 4 for each terminal with respect to terminals using radio in a corresponding area. The analytics information may be generated by separately requesting the two types of analytics information in the aforementioned embodiment.

Figure 8:
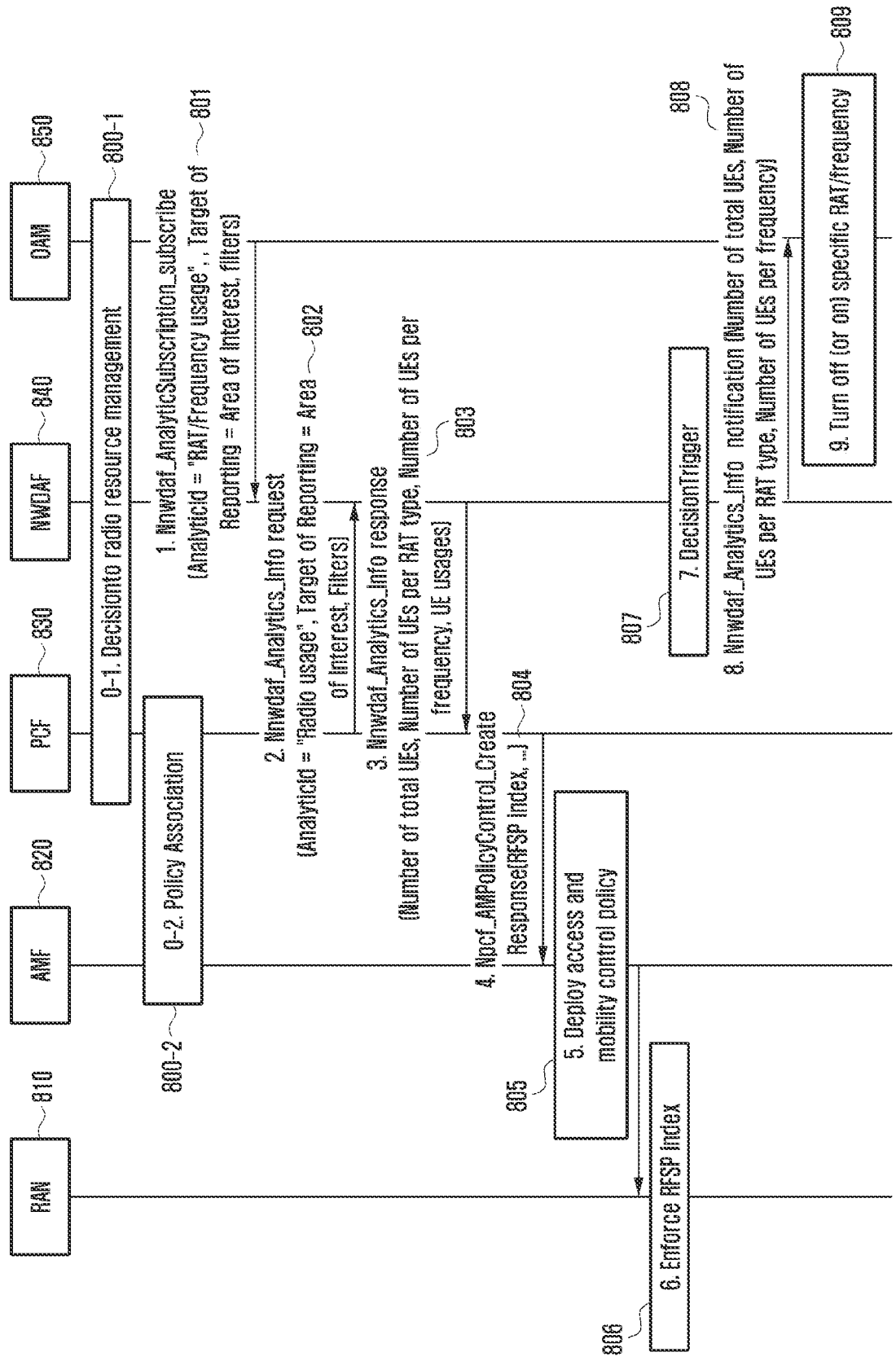
FIG. 8 is a diagram illustrating a process of using, by the PCF and the OAM, network analytics information of the NWDAF in order to reduce power necessary for the management of a radio resource.

A procedure for the disclosure is illustrated in FIG. 8. FIG. 8 illustrates a process of using, by the PCF and the OAM, network analytics information of the NWDAF in order to reduce power necessary for the management of a radio resource.

Step 800-1. A PCF 830 and OAM 850 may determine a mobile communication network operation policy. For example, the PCF 830 and the OAM 850 may determine a radio resource management, such as a reduction in network operation power, the minimization of radio resource interference, or the maximization of service quality, and an internal policy that follows the object. Accordingly, the PCF 830 and the OAM 850 may internally determine that the PCF 830 and the OAM 850 need to perform an operation, such as cutting off the power source of a base station, which is not used or whose usage is low, or changing a configuration of a base station in which interference may occur.

Step 800-2. An AMF 820 may establish AM_PolicyControl-related Association with the PCF 830 in order to receive an access and mobility-related policy in registration that is managed by the AMF.

Step 801—the OAM 850 may request network analytics information for a radio access technology and frequency for each specific area through a message provided by an NWDAF 840. The message may be Nnwadf_AnalyticsSubscription_subscribe. In this case, information related to the time may be additionally delivered in filter information for limiting and providing information used by a terminal in a specific interval or at specific future timing. Additionally, if only analytics information for a specific RAT or a specific frequency band is necessary, the specific RAT or frequency band may be included in a filter. In this process, if the information is necessary on a one-off basis, Nnwdaf_AnalyticInfo_Request may be used instead of Nnwadf_AnalyticsSubscription_subscribe. The OAM 850 may configure a filter which enables notification to be received if the number of UEs using a specific radio access technology or frequency band drops to a given value or less or increases to a given value or more.

Step 802—the PCF 830 may request network analytics information related to radio usage for each specific area through a message provided by the NWDAF 840. The message may be Nnwadf_AnalyticsSubscription_subscribe. In this case, information related to the time may be additionally delivered in filter information for limiting and providing information used by a terminal in a specific interval or at specific future timing. Additionally, if only analytics information for a specific RAT or a specific frequency band is necessary, the specific RAT or frequency band may be included in a filter. In this process, if the information is necessary on a one-off basis, Nnwdaf_AnalyticInfo_Request may be used instead of Nnwadf_AnalyticsSubscription_subscribe. In this case, in relation to the requested analytics information, the aforementioned radio usage analytics information may be requested, or the usage analytics information for each terminal or the radio access technology and frequency band usage information for each area, which are included in the aforementioned embodiment, may be separately requested.

Step 803—the NWDAF 840 may collect information necessary to provide the requested network analytics information, and may generate the analytics information based on the information. In this case, if terminal-related information is previously collected, a process of collecting network information may be omitted. The generated analytics information may be delivered to the PCF 830.

Step 804—the PCF 830 may determine a current RFSP index value of each of terminals according to the internal policy. In this case, a consumer who uses a specific technology or frequency band may be made to be not present by changing a radio access technology or frequency band having small consumers. On the contrary, if a movement of a terminal or usages of a service that requests a specific service level is expected, a terminal may also be guided to a radio access technology or frequency band capable of providing quality. The determined RFSP index value may be delivered to the AMF 820.

Step 805—the AMF 820 that has received the RFSP index value of a new terminal from the PCF 830 may update the value, and may deliver the updated value to a necessary entity, such as a RAN 810.

Step 806—the RAN 810 may guide a terminal to a specific radio access technology or frequency band with reference to the RFSP index value of the terminal.

Step 807—a consumer may vary in a specific radio access technology or frequency band according to the guidelines of the PCF 830, and this condition satisfies a condition configured by the OAM 850.

Step 808—the NWDAF 840 may deliver the generated analytics information to the OAM 850 that has requested the analytics information. In the case of subscription in step 801, the analytics information may be delivered whenever a condition in which notification is delivered is satisfied. If the analytics information has been requested on a one-off basis by using AnalyticInfo_Regeust, the process may be terminated after notification related to the analytics information is transmitted once.

Step 809—the OAM 850 may cut off the power source of a specific base station or change a configuration of a radio resource with reference to the number of radio access apparatuses or a present usage situation of a frequency band.

FIG. 8 has been illustrated to describe a reduction in power used in a base station, but an operation, such as turning on a base station that supports a specific radio technology or allocating a new radio resource, may also be applied by changing the aforementioned sequence as the number of UEs or service requirements is increased.

Figure 9:
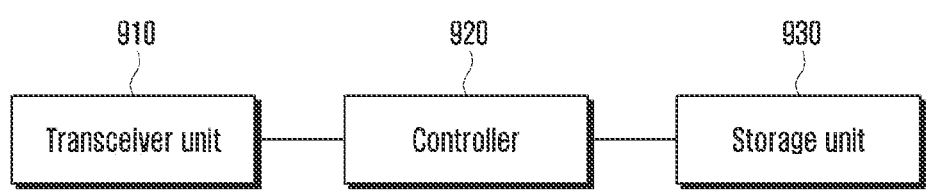
FIG. 9 is a diagram illustrating a structure of network entities according to an embodiment of the disclosure.

FIG. 9 is a diagram illustrating a structure of network entities according to an embodiment of the disclosure.

With reference to FIG. 9, the network entities may include a transceiver unit 910, a controller 920, and a storage unit 930. In the disclosure, the controller may be defined as a circuit, an application-specific integrated circuit, or at least one processor.

The transceiver unit 910 may transmit and receive signals to and from another network entity. The transceiver unit 910 may receive system information from a base station, for example, and may receive a synchronization signal or a reference signal.

The controller 920 may control an overall operation of the network entities according to an embodiment proposed in the disclosure. For example, the controller 920 may control a flow of signals between blocks so that an operation according to the procedures described with reference to FIGS. 1 to 8 is performed. For example, the controller 920 may control an operation proposed in the disclosure in order to provide service detection in a mobile communication system according to an embodiment of the disclosure.

The storage unit 930 may store at least one of information transmitted and received through the transceiver unit 910 and information generated through the controller 920. For example, the storage unit 930 may store information required for service detection according to the aforementioned embodiment, etc.

The embodiments disclosed above in the specification and drawings merely propose specific examples in order to easily describe the contents of the disclosure and help understanding of the disclosure, and are not intended to restrict the scope of the disclosure. Furthermore, one or more of the aforementioned several embodiments may be combined and performed. Accordingly, all changes or modified forms derived based on the technical spirit of the disclosure, in addition to the disclosed embodiments, should be construed as being included in the scope of the disclosure.

The invention claimed is:

1. A method performed by a network data analytics function (NWDAF) in a communication system, the method comprising:
receiving, from a policy control function (PCF), a message including a request for radio access analytics information on a terminal in a specific area, wherein the request is associated with a policy configured between the PCF and an operation, administration, and maintenance (OAM);
obtaining, usage information related to a service used by the terminal in the specific area and network information related to a frequency band for each radio access technology (RAT) supported in the specific area, based on the message;
identifying a correlation for the specific area based on the service used by the terminal and the frequency band for each RAT;
generating the radio access analytics information based on the identified correlation; and
transmitting, to the PCF, the generated radio access analytics information,
wherein the radio access analytics information is used to configure a radio/frequency selection priority (RFSP) index value indicating a specific frequency band for a RAT, and
wherein the specific frequency band for the RAT is for the service in the specific area.

2. The method of claim 1, wherein the radio access analytics information comprises at least one of a total number of terminals being used in the specific area, number of terminals for each RAT supported in the specific area, number of terminals for each frequency band supported in the specific area, number of off-loadable terminals to another RAT supported in the specific area, number of non-off-loadable terminals to another RAT supported in the specific area, number of off-loadable terminals to another frequency band supported in the specific area, number of non-off-loadable terminals to another frequency band supported in the specific area, a total data rate, a data rate for each RAT supported in the specific area, and a data rate for each frequency band supported in the specific area.

3. The method of claim 1, wherein the radio access analytics information comprises usage-related analytics information of the terminal, and
wherein the usage-related analytics information of the terminal comprises at least one of information on a slice used by the terminal, information on a data network used by the terminal, an identifier of the terminal, a terminal usage type, a media type, a mobility type, an average bandwidth, a maximum bandwidth, a use application list, and a fifth generation quality of service identifier (5QI) list.

4. The method of claim 1, further comprising:
receiving, from the OAM, a request message including a request for the radio access analytics information; and
transmitting, to the OAM, the radio access analytics information,
wherein the radio access analytics information is used to manage a base station supporting the frequency band for each RAT in the specific area, based on the specific frequency band for the RAT for the service.

5. A method performed by a policy control function (PCF) in a communication system, the method comprising:
transmitting, to a network data analytics function (NWDAF), a message including a request for radio access analytics information on a terminal in a specific area, wherein the request is associated with a policy configured between the PCF and an operation, administration, and maintenance (OAM);
receiving, from the NWDAF, the radio access analytics information related to a correlation for the specific area based on a service used by the terminal in the specific area and frequency band for each radio access technology (RAT) supported in the specific area; and
configuring a radio/frequency selection priority (RFSP) index value indicating a specific frequency band for a RAT, based on the received network analytics information,
wherein the specific frequency band for the RAT is for the service in the specific area.

6. The method of claim 5, wherein the radio access analytics information comprises at least one of a total number of terminals being used in the specific area, number of terminals for each RAT supported in the specific area, number of terminals for each frequency band supported in the specific area, number of off-loadable terminals to another RAT supported in the specific area, number of non-off-loadable terminals to another RAT supported in the specific area, number of off-loadable terminals to another frequency band supported in the specific area, number of non-off-loadable terminals to another frequency band supported in the specific area, a total data rate, a data rate for each RAT supported in the specific area, and a data rate for each frequency band supported in the specific area.

7. The method of claim 5, wherein the radio access analytics information comprises usage-related analytics information of the terminal, and
wherein the usage-related analytics information of the terminal comprises at least one of information on a slice used by the terminal, information on a data network used by the terminal, an identifier of the terminal, a terminal usage type, a media type, a mobility type, an average bandwidth, a maximum bandwidth, a use application list, and a fifth generation quality of service identifier (5QI) list.

8. The method of claim 5, further comprising transmitting the configured RFSP index value to an access and mobility management function (AMF).

9. A network data analytics function (NWDAF) in a communication system, the NWDAF comprising:
a transceiver; and
a controller coupled with the transceiver and configured to:
receive, from a policy control function (PCF), a message including a request for radio access analytics information on a terminal in a specific area, wherein the request is associated with a policy configured between the PCF and an operation, administration, and maintenance (OAM),
obtain usage information related to a service used by the terminal in the specific area and network information related to a frequency band for each radio access technology (RAT) supported in the specific area, based on the message,
identify a correlation for the specific area based on the service used by the terminal and the frequency band for each RAT,
generate the radio access analytics information based on the identified correlation, and
transmit, to the PCF, the radio access generated analytics information,
wherein the radio access analytics information is used to configure a radio/frequency selection priority (RFSP) index value indicating a specific frequency band for a RAT, and wherein the specific frequency band for the RAT is for the service in the specific area.

10. The NWDAF of claim 9, wherein the radio access analytics information comprises at least one of a total number of terminals being used in the specific area, number of terminals for each RAT supported in the specific area, number of terminals for each frequency band supported in the specific area, number of off-loadable terminals to another RAT supported in the specific area, number of non-off-loadable terminals to another RAT supported in the specific area, number of off-loadable terminals to another frequency band supported in the specific area, number of non-off-loadable terminals to another frequency band supported in the specific area, a total data rate, a data rate for each RAT supported in the specific area, and a data rate for each frequency band supported in the specific area.

11. The NWDAF of claim 9, wherein the radio access analytics information comprises usage-related analytics information of a terminal, and
wherein the usage-related analytics information of the terminal comprises at least one of information on a slice used by the terminal, information on a data network used by the terminal, an identifier of the terminal, a terminal usage type, a media type, a mobility type, an average bandwidth, a maximum bandwidth, a use application list, and a fifth generation quality of service identifier (5QI) list.

12. The NWDAF of claim 9, wherein the controller is further configured to:
receive, from the OAM, a request message including a request for the radio access analytics information, and
transmit, to the OAM, the radio access analytics information,
wherein the radio access analytics information is used to manage a base station supporting the frequency band for each RAT in the specific area, based on the specific frequency band for the RAT for the service.

13. A policy control function (PCF) in a communication system, the PCF comprising:
a transceiver; and
a controller coupled with the transceiver and configured to:
transmit, to a network data analytics function (NWDAF), a message including a request for radio access analytics information on a terminal in a specific area, wherein the request is associated with a policy configured between the PCF and an operation, administration, and maintenance (OAM),
receive, from the NWDAF, the radio access analytics information related to a correlation for the specific area based on a service used by the terminal in the specific area and frequency band for each radio access technology (RAT) supported in the specific area, and
configure a radio/frequency selection priority (RFSP) index value indicating a specific frequency band for a RAT, based on the radio access analytics information,
wherein the specific frequency band for the RAT is for the service in the specific area.

14. The PCF of claim 13, wherein the radio access analytics information comprises at least one of a total number of terminals being used in a specific area, number of terminals for each RAT supported in the specific area, number of terminals for each frequency band supported in the specific area, number of off-loadable terminals to another RAT supported in the specific area, number of non-off-loadable terminals to another RAT supported in the specific area, number of off-loadable terminals to another frequency band supported in the specific area, number of non-off-loadable terminals to another frequency band supported in the specific area, a total data rate, a data rate for each RAT supported in the specific area, and a data rate for each frequency band supported in the specific area.

15. The PCF of claim 13, wherein the controller is further configured to transmit the configured RFSP index value to an access and mobility management function (AMF),
wherein the radio access analytics information comprises usage-related analytics information of a terminal, and
wherein the usage-related analytics information of the terminal comprises at least one of information on a slice used by the terminal, information on a data network used by the terminal, an identifier of the terminal, a terminal usage type, a media type, a mobility type, an average bandwidth, a maximum bandwidth, a use application list, and a fifth generation quality of service identifier (5QI) list.

\* \* \* \* \*